US011958199B2

(12) United States Patent
Higashi et al.

(10) Patent No.: US 11,958,199 B2
(45) Date of Patent: Apr. 16, 2024

(54) ROBOT CONTROL DEVICE AND ROBOT SYSTEM

(71) Applicant: Seiko Epson Corporation, Tokyo (JP)

(72) Inventors: Daisuke Higashi, Matsumoto (JP); Takahiro Kamijo, Fujimi (JP); Tomonori Yamada, Shiojiri (JP); Motoki Ito, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 247 days.

(21) Appl. No.: 17/463,616

(22) Filed: Sep. 1, 2021

(65) Prior Publication Data

US 2022/0063102 A1     Mar. 3, 2022

(30) Foreign Application Priority Data

Sep. 2, 2020    (JP) .................................. 2020-147369

(51) Int. Cl.
*B25J 9/16*    (2006.01)

(52) U.S. Cl.
CPC ............. *B25J 9/1674* (2013.01); *B25J 9/161* (2013.01)

(58) Field of Classification Search
CPC .................... B25J 9/1674; B25J 9/161; G05B 2219/50198
See application file for complete search history.

(56) References Cited

U.S. PATENT DOCUMENTS

| 10,250,169 | B2 * | 4/2019 | Nishino | B25J 19/06 |
|---|---|---|---|---|
| 2005/0209734 | A1 * | 9/2005 | Tanaka | F16P 3/003 |
| | | | | 700/245 |
| 2007/0096674 | A1 | 5/2007 | Hashimoto et al. | |
| 2009/0309531 | A1 * | 12/2009 | Hamahata | H02P 6/04 |
| | | | | 318/565 |
| 2013/0271046 | A1 * | 10/2013 | Sussman | H02P 3/02 |
| | | | | 318/379 |
| 2014/0021805 | A1 | 1/2014 | Koyama | |
| 2016/0031077 | A1 * | 2/2016 | Inaba | B25J 9/0081 |
| | | | | 901/3 |
| 2016/0363924 | A1 * | 12/2016 | Tanaka | G05B 19/4063 |

(Continued)

FOREIGN PATENT DOCUMENTS

| JP | 2005-103690 A | 4/2005 |
|---|---|---|
| JP | 2006-119995 A | 5/2006 |
| JP | 2007-118141 A | 5/2007 |

(Continued)

*Primary Examiner* — Adam R Mott
*Assistant Examiner* — Sagar K C
(74) *Attorney, Agent, or Firm* — Harness, Dickey & Pierce, P.L.C.

(57) ABSTRACT

A robot control device that controls operation of a robot including a robot arm, a driving section configured to drive the robot arm, and a driving control section configured to receive electric power supplied to the driving section and output power to the driving section based on an input control signal, the robot control device including a logical operation circuit configured to perform a logical operation about a stop signal and output an operation result and a power interruption circuit configured to interrupt, based on the operation result, the electric power supplied to the driving control section or the control signal input to the driving control section to thereby interrupt the power of the driving section.

9 Claims, 8 Drawing Sheets

(56) References Cited

U.S. PATENT DOCUMENTS

2020/0156262 A1\* 5/2020 Yamamoto ............... B25J 9/163
2020/0403552 A1\* 12/2020 Chang .................... H02M 7/00

FOREIGN PATENT DOCUMENTS

| JP | 2010-104187 | A | | 5/2010 | |
|----|-------------|---|---|--------|---|
| JP | 2010-188498 | A | | 9/2010 | |
| JP | 2014-019144 | A | | 2/2014 | |
| KR | 0155288 | B1 | \* | 12/1998 | |
| WO | WO-0024053 | A1 | \* | 4/2000 | ............ B25J 13/088 |

\* cited by examiner

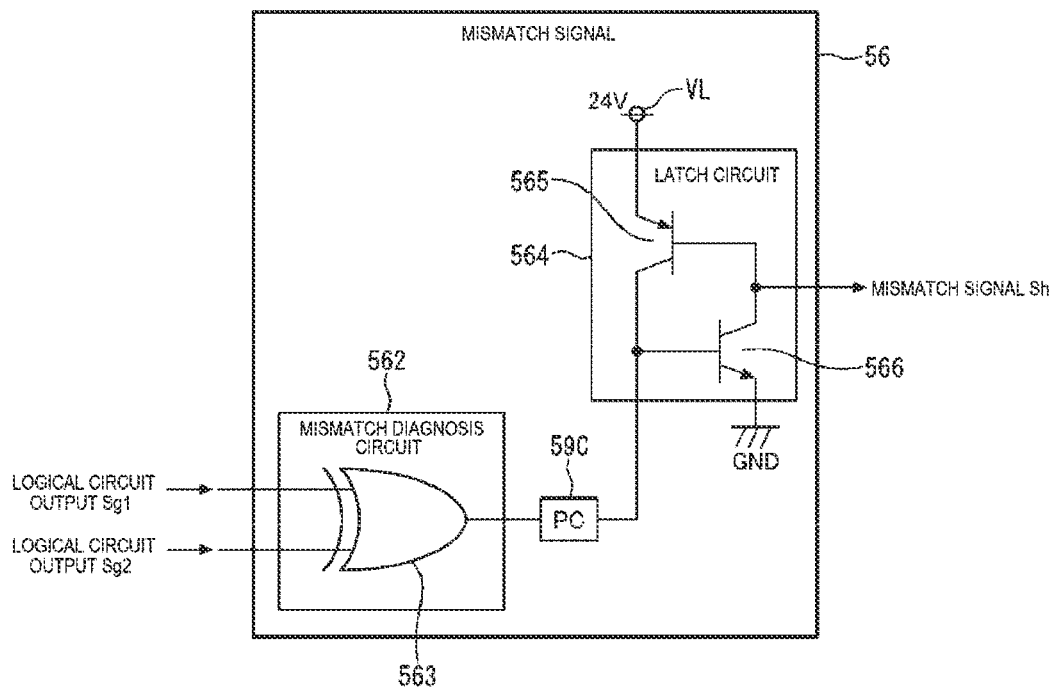

ROBOT CONTROL DEVICE AND ROBOT SYSTEM

The present application is based on, and claims priority from JP Application Serial Number 2020-147369, filed Sep. 2, 2020, the disclosure of which is hereby incorporated by reference herein in its entirety.

BACKGROUND

1. Technical Field

The present disclosure relates to a robot control device and a robot system.

2. Related Art

JP-A-2014-19144 (Patent Literature 1) discloses an injection molding machine including a movable section driven by a motor and a motor-power interrupting section that repeats energization and interruption of power to the motor. The motor-power interrupting section includes three power interrupting sections connected in series. The power interrupting sections are provided in a servo amplifier that supplies driving power to the motor. The power interrupting sections operate to interrupt the power to the motor independently from one another.

By interrupting the power using a plurality of power interrupting sections as described in Patent Literature 1, a reference for determining the interruption of the power to the motor is diversified. On the other hand, the number of factors that could cause a failure in interrupting the power increases. Accordingly, it is difficult to improve safety in the entire motor-power interrupting section.

SUMMARY

A robot control device according to an application example of the present disclosure is a robot control device that controls operation of a robot including a robot arm, a driving section configured to drive the robot arm, and a driving control section configured to receive electric power supplied to the driving section and output power to the driving section based on an input control signal, the robot control device including: a logical operation circuit configured to perform a logical operation about a stop signal and output an operation result; and a power interruption circuit configured to interrupt, based on the operation result, the electric power supplied to the driving control section or the control signal input to the driving control section to thereby interrupt the power of the driving section.

A robot system according to an application example of the present disclosure includes: a robot including a robot arm, a driving section configured to drive the robot arm, and a driving control section configured to receive electric power supplied to the driving section and output power to the driving section based on an input control signal; and the robot control device according to the application example of the present disclosure that controls operation of the robot.

BRIEF DESCRIPTION OF THE DRAWINGS

FIG. 8 is a timing chart showing an example of the first signals, which are the stop signals on the first interruption circuit side, and the logical circuit output.

FIG. 9 is a schematic diagram showing a circuit configuration of a mismatch circuit.

DESCRIPTION OF EXEMPLARY EMBODIMENTS

A robot control device and a robot system according to the present disclosure are explained in detail below based on embodiments shown in the accompanying drawings.

1. First Embodiment

First, a robot system and a robot control device according to a first embodiment are explained.

Figure 1:
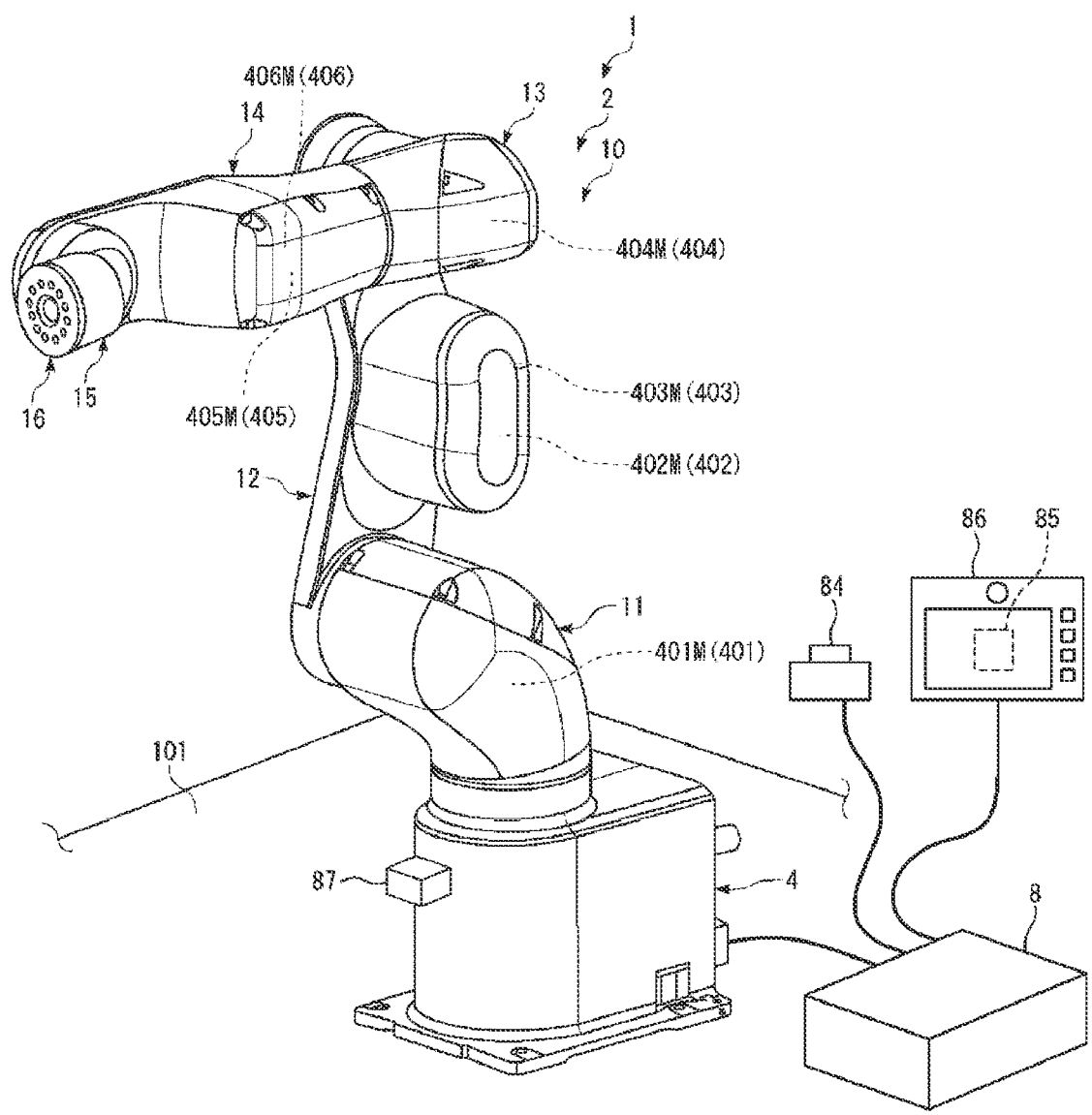
FIG. 1 is a perspective view showing a robot system according to a first embodiment.
Figure 2:
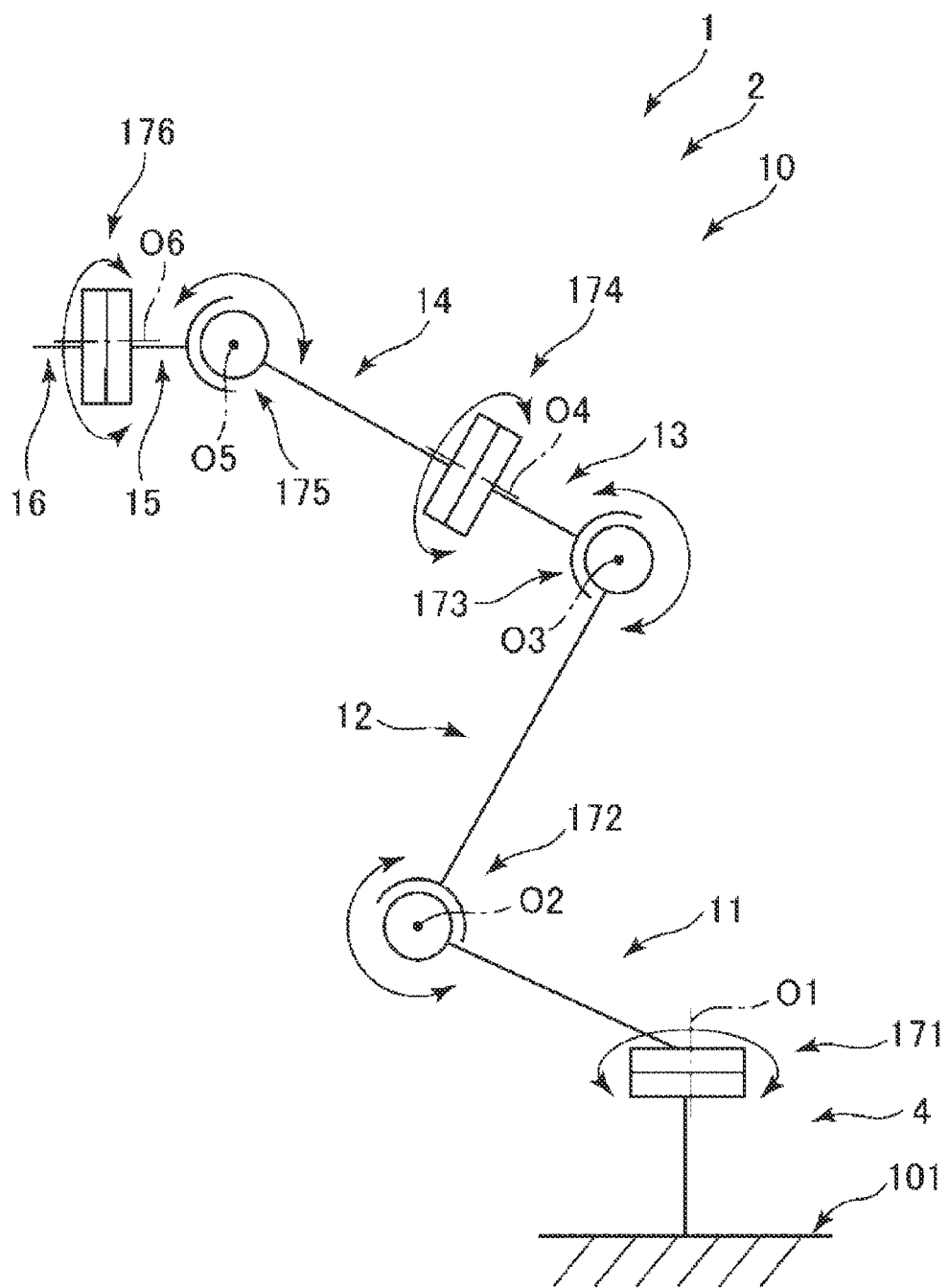
FIG. 2 is a schematic diagram of a robot shown in FIG. 1.
Figure 3:
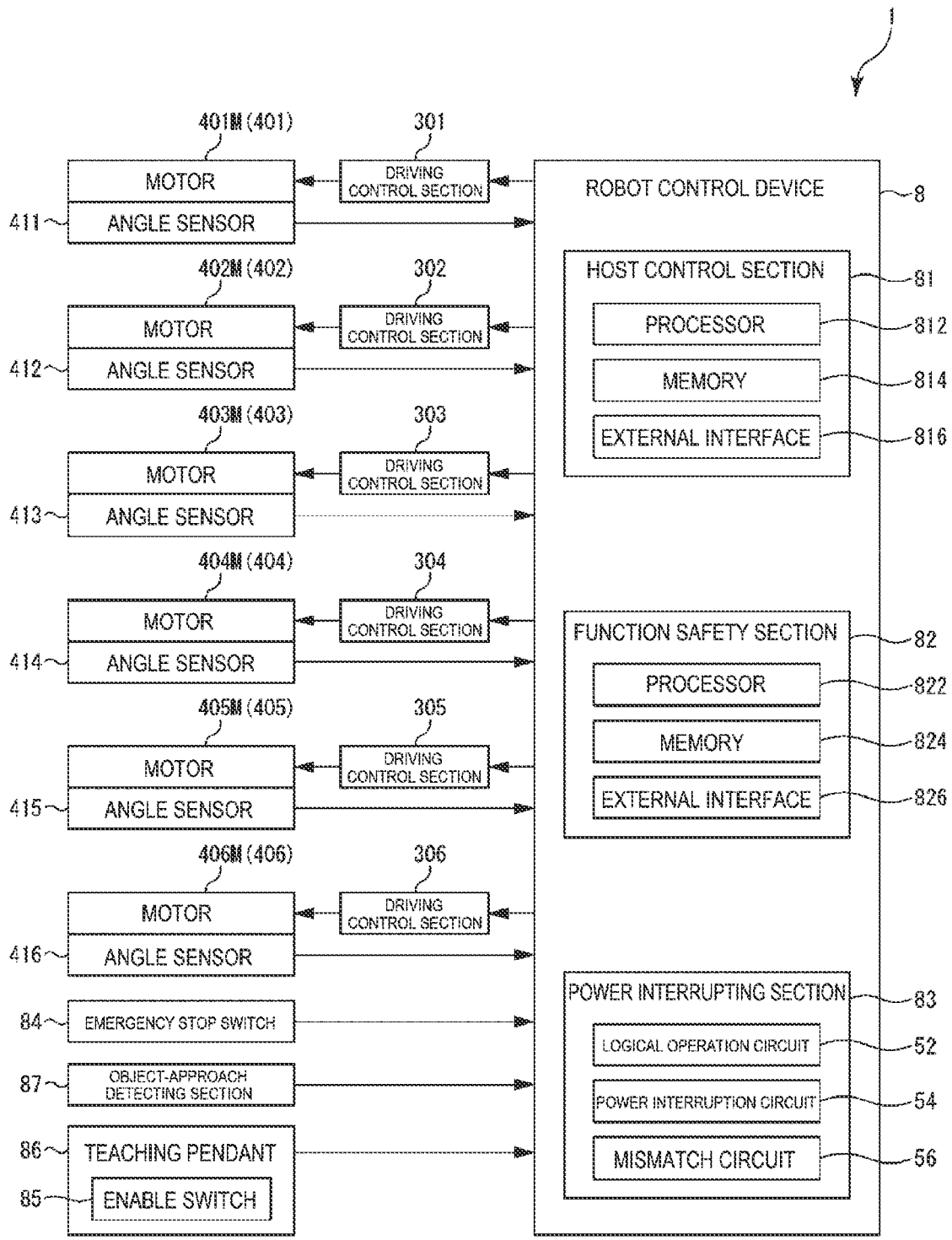
FIG. 3 is a block diagram showing a main part of the robot system shown in FIG. 1.

FIG. 1 is a perspective view showing a robot system according to the first embodiment. FIG. 2 is a schematic diagram of a robot shown in FIG. 1. FIG. 3 is a block diagram showing a main part of the robot system shown in FIG. 1.

1.1. Robot System

A robot system 1 shown in FIG. 1 is used in work such as conveyance, assembly, and inspection of various workpieces (target objects).

As shown in FIGS. 1 to 3, the robot system 1 includes a robot 2 including a base 4, a robot arm 10, driving sections 401 to 406, and driving control sections 301 to 306 and a robot control device 8 that controls the operation of the robot 2.

The base 4 shown in FIGS. 1 and 2 are placed on a flat floor 101. The base 4 may be placed on a wall, a ceiling, a stand, or the like rather than the floor 101.

The robot arm 10 shown in FIGS. 1 and 2 includes a first arm 11, a second arm 12, a third arm 13, a fourth arm 14, a fifth arm 15, and a sixth arm 16. A not-shown end effector can be detachably attached to the distal end of the sixth arm 16. The end effector can, for example, grip a workpiece. The workpiece, for example, gripped by the end effector is not particularly limited. Examples of the workpiece include an electronic component and an electronic device. In this specification, the base 4 side based on the sixth arm 16 is referred to as "proximal end side" and the sixth arm 16 side based on the base 4 is referred to as "distal end side".

The end effector is not particularly limited. Examples of the end effector include a hand that grips the workpiece and a suction head that sucks the workpiece.

A not-shown force detecting section may be provided between the sixth arm 16 and the end effector. The force detecting section detects force applied to the end effector. Examples of the force detecting section include a six-axis force sensor capable of detecting force components (translational force components) in axial directions of respective three axes orthogonal to one another and force components (rotational force component) around the respective three axes.

1.2. Robot

The robot 2 is a single-arm six-axis vertical articulated robot in which the base 4, the first arm 11, the second arm 12, the third arm 13, the fourth arm 14, the fifth arm 15, and the sixth arm 16 are coupled in this order from the proximal end side toward the distal end side. In the following explanation, the first arm 11, the second arm 12, the third arm 13, the fourth arm 14, the fifth arm 15, and the sixth arm 16 are respectively referred to as "arms" as well. The lengths of the arms 11 to 16 are not particularly limited and can be set as appropriate.

The base 4 and the first arm 11 are coupled via a joint 171. The first arm 11 is capable of turning with respect to the base 4 around a first turning axis O1 parallel to the vertical axis. The first arm 11 turns according to driving of the driving section 401 including a motor 401M and a not-shown speed reducer. The motor 401M generates a driving force for turning the first arm 11. The operation of the driving section 401 is controlled by the robot control device 8 via the driving control section 301, which is a motor driver.

The first arm 11 and the second arm 12 are coupled via a joint 172. The second arm 12 is capable of turning with respect to the first arm 11 around a second turning axis O2 parallel to the horizontal plane. The second arm 12 turns according to driving of the driving section 402 including a motor 402M and a not-shown speed reducer. The motor 402M generates a driving force for turning the second arm 12. The operation of the driving section 402 is controlled by the robot control device 8 via the driving control section 302, which is a motor driver.

The second arm 12 and the third arm 13 are coupled via a joint 173. The third arm 13 is capable of turning with respect to the second arm 12 around a third turning axis O3 parallel to the horizontal plane. The third arm 13 turns according to driving of the driving section 403 including a motor 403M and a not-shown speed reducer. The motor 403M generates a driving force for turning the third arm 13. The operation of the driving section 403 is controlled by the robot control device 8 via the driving control section 303, which is a motor driver.

The third arm 13 and the fourth arm 14 are coupled via a joint 174. The fourth arm 14 is capable of turning with respect to the third arm 13 around a fourth turning axis O4 parallel to the center axis of the third arm 13. The fourth arm 14 turns according to driving of the driving section 404 including a motor 404M and a not-shown speed reducer. The motor 404M generates a driving force for turning the fourth arm 14. The operation of the driving section 404 is controlled by the robot control device 8 via the driving control section 304, which is a motor driver.

The fourth arm 14 and the fifth arm 15 are coupled via a joint 175. The fifth arm 15 is capable of turning with respect to the fourth arm 14 around a fifth turning axis O5 orthogonal to the center axis of the fourth arm 14. The firth arm 15 turns according to driving of the driving section 405 including a motor 405M and a not-shown speed reducer. The motor 405M generates a driving force for turning the fifth arm 15. The operation of the driving section 405 is controlled by the robot control device 8 via the driving control section 305, which is a motor driver.

The fifth arm 15 and the sixth arm 16 are coupled via a joint 176. The sixth arm 16 is capable of turning with respect to the fifth arm 15 around a sixth turning axis O6 parallel to the center axis of the distal end portion of the fifth arm 15. The sixth arm 16 turns according to driving of the driving section 406 including a motor 406M and a not-shown speed reducer. The motor 406M generates a driving force for turning the sixth arm 16. The operation of the driving section 406 is controlled by the robot control device 8 via the driving control section 306, which is a motor driver.

In the driving sections 401 to 406, as shown in FIG. 3, angle sensors 411 to 416 are provided. Examples of the angle sensors 411 to 416 include various encoders such as a rotary encoder. The angle sensors 411 to 416 detect turning angles of output shafts of the motors or the speed reducers of the driving sections 401 to 406.

Examples of the motors of the driving sections 401 to 406 include an AC servomotor and a DC servomotor.

Examples of the speed reducers of the driving sections 401 to 406 include a planetary gear-type speed reducer configured by a plurality of gears and a wave motion speed reducer.

The driving sections 401 to 406 and the angle sensors 411 to 416 are respectively electrically connected to the robot control device 8.

The robot control device 8 controls the operations of the driving sections 401 to 406 independently from one another via the driving control sections 301 to 306. Specifically, the robot control device 8 controls operation conditions, for example, angular velocities and rotation angles of the driving sections 401 to 406 respectively based on detection results of the angle sensors 411 to 416 and not-shown force detecting sections.

1.3. Configuration of the Robot Control Device

The robot control device 8 includes a host control section 81, a function safety section 82, and a power interrupting section 83. The robot control device 8 includes an emergency stop switch 84 (an emergency-stop-signal generating section), a teaching pendant 86 including an enable switch 85 (an enable-stop-signal generating section), and an object-approach detecting section 87 (a protection-stop-signal generating section).

1.3.1. Host Control Section

The host control section 81 controls the operations of the driving control sections 301 to 306 and controls the operation of the robot 2.

A hardware configuration of the host control section 81 is not particularly limited. In FIG. 3, the host control section 81 includes a processor 812, a memory 814, and an external interface 816. These devices are communicably connected to one another via an internal bus.

Examples of the processor 812 include a CPU (Central Processing Unit), an FPGA (Field-Programmable Gate Array), and an ASIC (Application Specific Integrated Circuit).

The processor 812 executes various programs stored in the memory 814 to thereby control the operation of the robot 2.

Examples of the memory 814 include a volatile memory such as a RAM (Random Access Memory) and a nonvolatile memory such as a ROM (Read Only Memory). The memory 814 is not limited to a non-detachable type and may be a detachable type.

The memory 814 stores, besides the various programs, various data received by the external interface 816 and various data output from the robot 2.

Examples of the external interface 816 include various communication techniques. Examples of the communication techniques include a USB (Universal Serial Bus), RS-232C, a wireless LAN (Local Area Network), and a wireless LAN.

As explained above, the host control section 81 having the hardware configuration explained above controls the operations of the driving control sections 301 to 306 and controls the operation of the robot 2. The host control section 81 reflects, on the operation of the robot 2, detection results of the angle sensors 411 to 416 and detection results of the not-shown force detecting sections, image sensors, depth sensors, and the like. Further, the host control section 81 outputs information concerning an operation state of the robot 2, for example, speed instructions to the driving control sections 301 to 306 to the power interrupting section 83 as control stop signals Sb1 and Sb2 explained below. The control stop signals Sb1 and Sb2 are the same signals and are transmitted to the power interrupting section 83 via different signal paths. The power interrupting section 83 explained below interrupts power of the robot 2 based on stop signals including the control stop signals Sb1 and Sb2 to thereby secure safety around the robot 2.

1.3.2. Function Safety Section

A hardware configuration of the function safety section 82 is not particularly limited. In FIG. 3, the function safety section 82 includes a processor 822, a memory 824, and an external interface 826. These devices are communicably connected to one another via the internal bus.

The memory 824 and the external interface 826 are the same as the memory 814 and the external interface 816 explained above.

Examples of the processor 822 include an FPGA and an ASIC.

The processor 822 executes various programs stored in the memory 824. Consequently, the function safety section 82 monitors detection results of the not-shown force detecting sections, image sensors, and depth sensors, a voltage of an AC power supply 71 shown in FIG. 3, an output voltage of a converter explained below, and the like. When recognizing an abnormality in monitor results, the function safe section 82 outputs presence or absence of an abnormality concerning function safety to the power interrupting section 83 as function safety stop signals Sc1 and Sc2 explained below. The function safety stop signals Sc1 and Sc2 are the same signals and are transmitted to the power interrupting section 83 via different signal paths. The power interrupting section 83 explained below interrupts the power of the robot 2 based on stop signals including the function safety stop signals Sc1 and Sc2 to thereby secure safety around the robot 2.

By providing the function safety section 82 independently from the host control section 81 in this way, control concerning function safety can be independently performed. Therefore, it is possible to further improve reliability of function safety. The function safety section 82 only has to be provided according to necessity and may be omitted.

1.3.3. Emergency Stop Switch

The emergency stop switch 84 (the emergency-stop-signal generating section) is a button that an operator presses when the operator desires to forcibly stop the operation of the robot 2. When the emergency stop switch 84 is pressed, emergency stop signals Sa1 and Sa2 explained blow are output to the power interrupting section 83. The emergency stop signals Sa1 and Sa2 are the same signals and are transmitted to the power interrupting section 83 via different signal paths. The power interrupting section 83 explained below interrupts the power of the robot 2 based on stop signals including the emergency stop signals Sa1 and Sa2 to thereby secure safety around the robot 2.

The emergency-stop-signal generating section is not limited to the button and can be replaced with a section that can output the emergency stop signals Sa1 and Sa2 according to the intention of the operator.

1.3.4. Teaching Pendant

The teaching pendant 86 is a tablet-type programming device for performing teaching work for the robot 2. The operator can carry the teaching pendant 86. The operator approaches the robot 2 while carrying the teaching pendant 86 and performs the teaching work.

The teaching pendant 86 includes the enable switch (the enable-stop-signal generating section). The enable switch 85 is configured to be able to be pressed by the operator holding the teaching pendant 86. The teaching pendant 86 is configured to be able to perform the teaching work only when a push-in position of the enable switch 85 by the operator is in a predetermined position. The enable switch 85 outputs, according to the push-in position, enable stop signals Sd1 and Sd2 explained below toward the power interrupting section 83. The enable stop signals Sd1 and Sd2 are the same signals and are transmitted to the power interrupting section 83 via different signal paths. The power interrupting section 83 explained below interrupts the power of the robot 2 based on stops signals including the enable stop signals Sd1 and Sd2 to thereby secure safety around the robot 2.

1.3.5. Object-Approach Detecting Section

When an object including a person approaches the robot 2 to a distance shorter than a distance set in advance around the robot 2, the object-approach detecting section 87 (the protection-stop-signal generating section) detects the approach. When the object-approach detecting section 87 detects the approach of the object, protection stop signals Se1 and Se2 explained below are output to the power interrupting section 83. The protection stop signals Se1 and Se2 are the same signals and are transmitted to the power interrupting section 83 via different signal paths. The power interrupting section 83 explained below interrupts the power of the robot 2 based on stop signals including the protection stops signals Se1 and Se2 to thereby secure safety around the robot 2.

Examples of the object-approach detecting section 87 include a safety fence including a safety door, a light curtain, a millimeter wave radar, a laser scanner, an image sensor, and an ultrasonic sensor. One or more of these devices are used. In FIG. 1, an example is illustrated in which the object-approach detecting section 87 is the light curtain.

1.3.6. Power Interrupting Section

Figure 4:
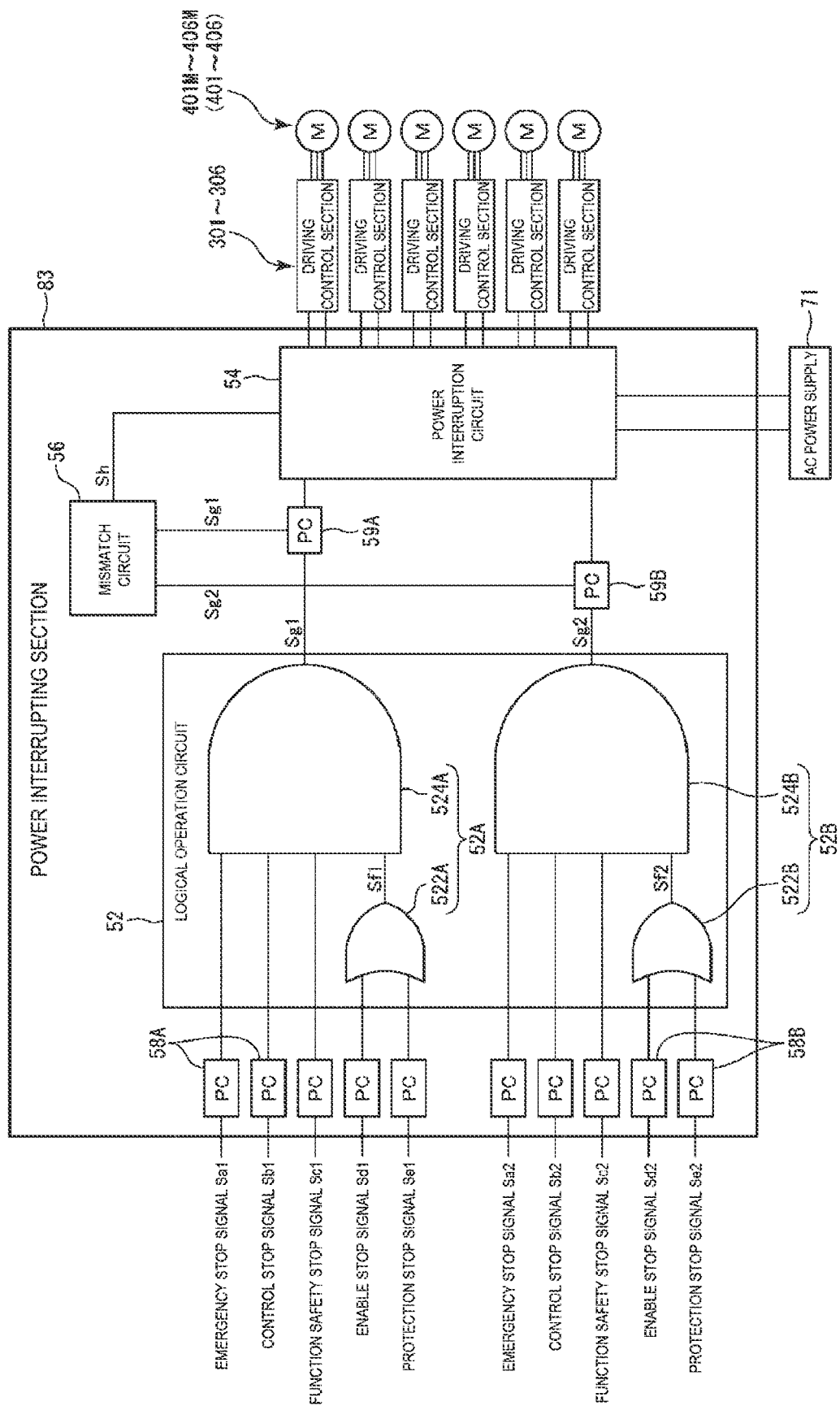
FIG. 4 is a schematic diagram showing a circuit configuration of a power interrupting section shown in FIG. 3.

FIG. 4 is a schematic diagram showing a circuit configuration of the power interrupting section 83 shown in FIG. 3.

The power interrupting section 83 shown in FIG. 4 includes a logical operation circuit 52, a power interruption circuit 54, a mismatch circuit 56, and photocouplers 58A, 58B, 59A, and 59B, which are insulating elements.

Stop signals duplexed into first signals and second signals are input to the arithmetic operation circuit 52 shown in FIG. 4. The arithmetic operation circuit 52 shown in FIG. 4 includes a first operation circuit 52A to which the first signals are input and a second operation circuit 52B to which the second signals are input.

The first signals according to this embodiment include the emergency stop signal Sa1, the control stop signal Sb1, the function safety stop signal Sc1, the enable stop signal Sd1, and the protection stop signal Se1. The second signals according to this embodiment include the emergency stop signal Sa2, the control stop signal Sb2, the function safety stop signal Sc2, the enable stop signal Sd2, and the protection stop signal Se2.

The first signals are input to the first operation circuit 52A respectively via the photocouplers 58A. The photocouplers 58A are respectively provided in the signal paths through which the emergency stop signal Sa1, the control stop signal Sb1, the function safety stop signal Sc1, the enable stop signal Sd1, and the protection stop signal Se1 are input to the first operation circuit 52A. The photocouplers 58A transmit the first signals while electrically insulating the signal paths. Consequently, since the signal paths can be electrically insulated, it is possible to design the first operation circuit 52A irrespective of specifications of the first signals. In other words, by using the photocouplers 58A, it is possible to realize the first operation circuit 52A applicable to the first signals having various specifications.

The photocouplers 58A can be replaced with digital isolators including insulating elements, for example, coils or capacitors having the same function.

The first operation circuit 52A includes an OR circuit 522A (an OR operation circuit) and an AND circuit 524A (an AND operation circuit).

The OR circuit 522A calculates OR Sf1 of the enable stop signal Sd1 and the protection stop signal Se1.

The AND circuit 524A calculates AND of the emergency stop signal Sa1, the control stop signal Sb1, the function safety stop signal Sc1, and the OR Sf1. An operation result of the AND is output from the first operation circuit 52A as a logical circuit output Sg1 (a first operation result).

The second signals are input to the second operation circuit 52B respectively via the photocouplers 58B. The photocouplers 58B are respectively provided in the signal paths through which the emergency stop signal Sa2, the control stop signal Sb2, the function safety stop signal Sc2, the enable stop signal Sd2, and the protection stop signal Se2 are input to the second operation circuit 52B. The photocouplers 58B transmit the second signals while electrically insulating the signal paths. Consequently, since the signal paths can be electrically insulated, it is possible to design the second operation circuit 52B irrespective of specifications of the second signals. In other words, by using the photocouplers 58B, it is possible to realize the second operation circuit 52B applicable to the second signals having various specifications.

The photocouplers 58B can be replaced with digital isolators including insulating elements, for example, coils or capacitors having the same function.

The second operation circuit 52B includes an OR circuit 522B (an OR operation circuit) and an AND circuit 524B (an AND operation circuit).

The OR circuit 522B calculates OR Sf2 of the enable stop signal Sd2 and the protection stop signal Se2.

The AND circuit 524B calculates AND of the emergency stop signal Sa2, the control stop signal Sb2, the function safety stop signal Sc2, and the OR Sf2. An operation result of the AND is output from the second operation circuit 52B as a logical circuit output Sg2 (a second operation result).

The power interruption circuit 54 shown in FIG. 4 interrupts power of the driving sections 401 to 406 based on the logical circuit output Sg1 (the first operation result) and the logical circuit output Sg2 (the second operation result).

Figure 5:
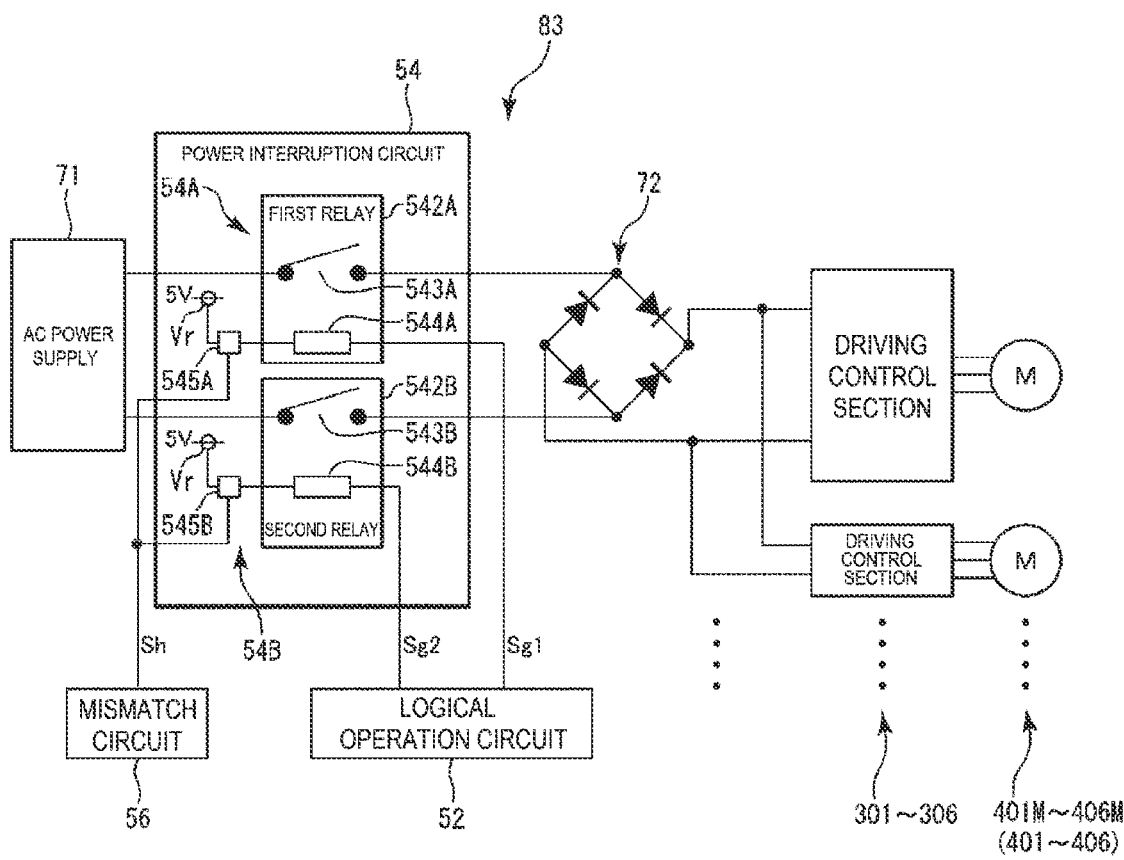
FIG. 5 is a schematic diagram showing a circuit configuration of a power interruption circuit shown in FIG. 4.

FIG. 5 is a schematic diagram showing a circuit configuration of the power interruption circuit 54 shown in FIG. 4. In FIG. 5, only necessary elements are illustrated and illustration of a part of elements is omitted.

The power interruption circuit 54 shown in FIG. 5 is provided between the AC power supply 71 and the driving control sections 301 to 306. In FIG. 5, a converter 72 provided between the power interruption circuit 54 and the driving control sections 301 to 306 is illustrated. The converter 72 shown in FIG. 5 is configured by a bridge diode and converts an AC voltage into a DC voltage and inputs the DC voltage to the driving control sections 301 to 306. The driving control sections 301 to 306 include not-shown inverter circuits and convert a DC voltage into an AC voltage. That is, the driving control sections 301 to 306 receive, from the AC power supply 71, via the power interruption circuit 54 and the converter 72, electric power for driving the driving sections 401 to 406. The driving control sections 301 to 306 drive the driving sections 401 to 406 with the electric power based on a control signal from the host control section 81 explained above.

The power interruption circuit 54 includes a first interruption circuit 54A that interrupts the power of the driving sections 401 to 406 based on the logical circuit output Sg1 and a second interruption circuit 54B that interrupts the power of the driving sections 401 to 406 based on the logical circuit output Sg2.

The first interruption circuit 54A includes a first relay 542A provided in a power supply path between the AC power supply 71 and the converter 72. The second interruption circuit 54B includes a second relay 542B provided in a power supply path between the AC power supply 71 and the converter 72. The first relay 542A and the second relay 542B respectively perform connection and disconnection of the power supply paths to thereby switch an input of the AC voltage from the AC power supply 71 to the converter 72.

The first relay 542A is a normally open relay including a contact 543A and a coil 544A. A relay power supply Vr and an output terminal of the first operation circuit 52A are connected to the coil 544A. A voltage of the relay power supply Vr is set to, for example, 5 V. When the logical circuit output Sg1 from the first operation circuit 52A is at a high level, an electric current flows to the coil 544A and the contact 543A is closed and connected. When the logical circuit output Sg1 from the first operation circuit 52A is at a low level, an electric current does not flow to the coil 544A and the contact 543A is opened and disconnected.

The second relay 542B is a normally open relay including a contact 543B and a coil 544B. The relay power supply Vr and an output terminal of the second operation circuit 52B are connected to the coil 544B. When the logical circuit output Sg2 from the second operation circuit 52B is at the high level, an electric current flows to the coil 544B and the contact 543B is closed and connected. When the logical circuit output Sg2 from the second operation circuit 52B is at the low level, an electric current does not flow to the coil 544B and the contact 543B is opened and disconnected.

Therefore, the power interruption circuit 54 can interrupt the power of the driving sections 401 to 406 based on the logical circuit outputs Sg1 and Sg2, which are operation results of the logical operation circuit 52.

As explained above, the robot control device 8 according to this embodiment is a control device that controls the operation of the robot 2. The robot 2 includes the robot arm 10, the driving sections 401 to 406 that drive the robot arm 10, and the driving control sections 301 to 306 that receive electric power supplied to the driving sections 401 to 406 and output power to the driving sections 401 to 406 based on a control signal input from the host control section 81. The robot control device 8 that controls the operation of such a robot 2 includes the logical operation circuit 52 and the power interruption circuit 54. The logical operation circuit 52 performs a logical operation based on stop signals and outputs the logical circuit outputs Sg1 and Sg2, which are operation results. The power interruption circuit 54 according to this embodiment interrupts, based on the logical circuit outputs Sg1 and Sg2, electric power supplied to the driving control sections 301 to 306 to thereby interrupt the power of the driving sections 401 to 406.

With such a configuration, even when interruption control for power is performed based on, as stop signals, a plurality of signals, for example, five types of signals, that is, the emergency stop signals Sa1 and Sa2, the control stop signals Sb1 and Sb2, the function safety stop signal Sc1 and Sc2, the enable stop signals Sd1 and Sd2, and protection stop signals Se1 and Se2, the power interruption circuit 54 can be integrated as one power interruption circuit. Consequently, it is possible to suppress redundancy of the power interruption circuit 54 and reduce a failure rate while realizing interruption control for power by various signals. As a result, it is possible to realize the robot control device 8 that can improve safety of the robot system 1.

With the configuration explained above, it is possible to realize interruption control for power irrespective of types and the number of signals included in the stop signals. Accordingly, it is possible to easily achieve platforming of the power interrupting section 83 and achieve a reduction in design manhour of the robot control device 8. Further, it is possible to fix a circuit configuration of the power interrupting section 83 irrespective of types and the number of signals included in the stop signals. Accordingly, in authentication for function safety, it is easy to exclude the power interrupting section 83 from an authentication range and narrow the authentication range. Consequently, it is possible to reduce manhour involved in authentication.

The number of signals included in the stop signals is not limited to five and may be three or four or may be six of more.

As explained above, the robot system 1 according to this embodiment includes the robot 2 and the robot control device 8. In such a robot system 1, a failure rate of the power interruption circuit 54 that interrupts the power of the driving sections 401 to 406 in the robot control device 8 is low. Therefore, high safety is guaranteed.

1.3.7. Operation Example of the Power Interrupting Section

Figure 6:
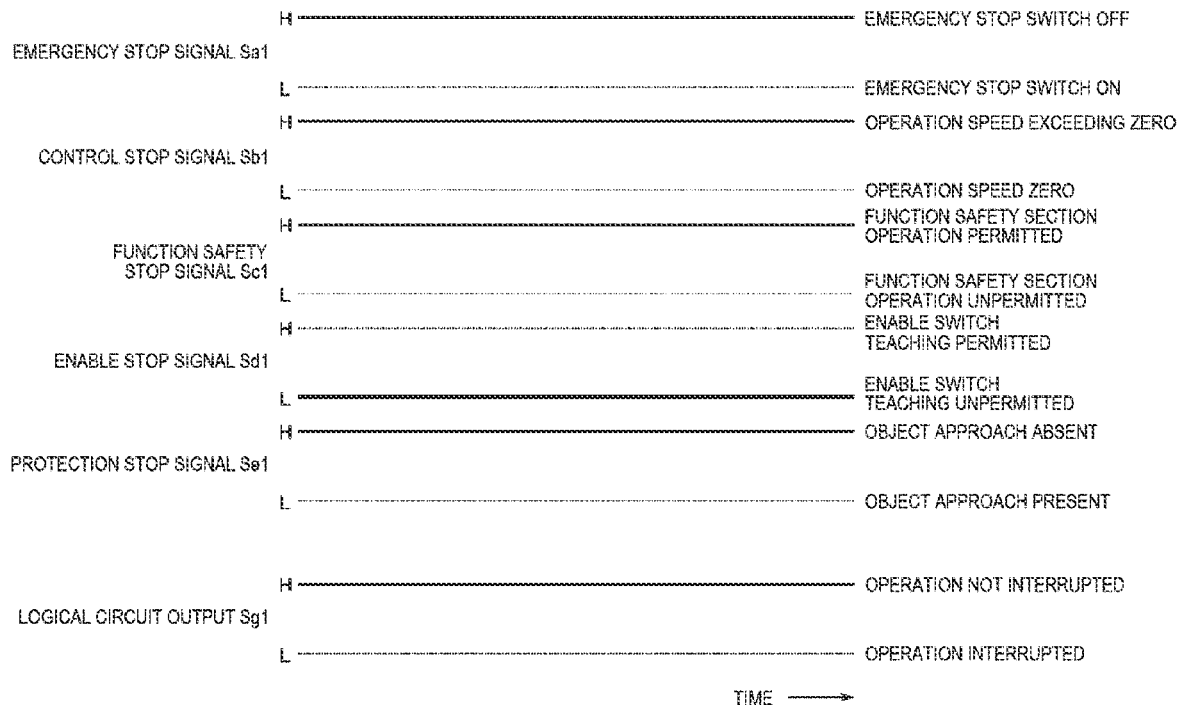
FIG. 6 is a timing chart showing an example of first signals, which are stop signals on a first interruption circuit side, and a logical circuit output.
Figure 7:
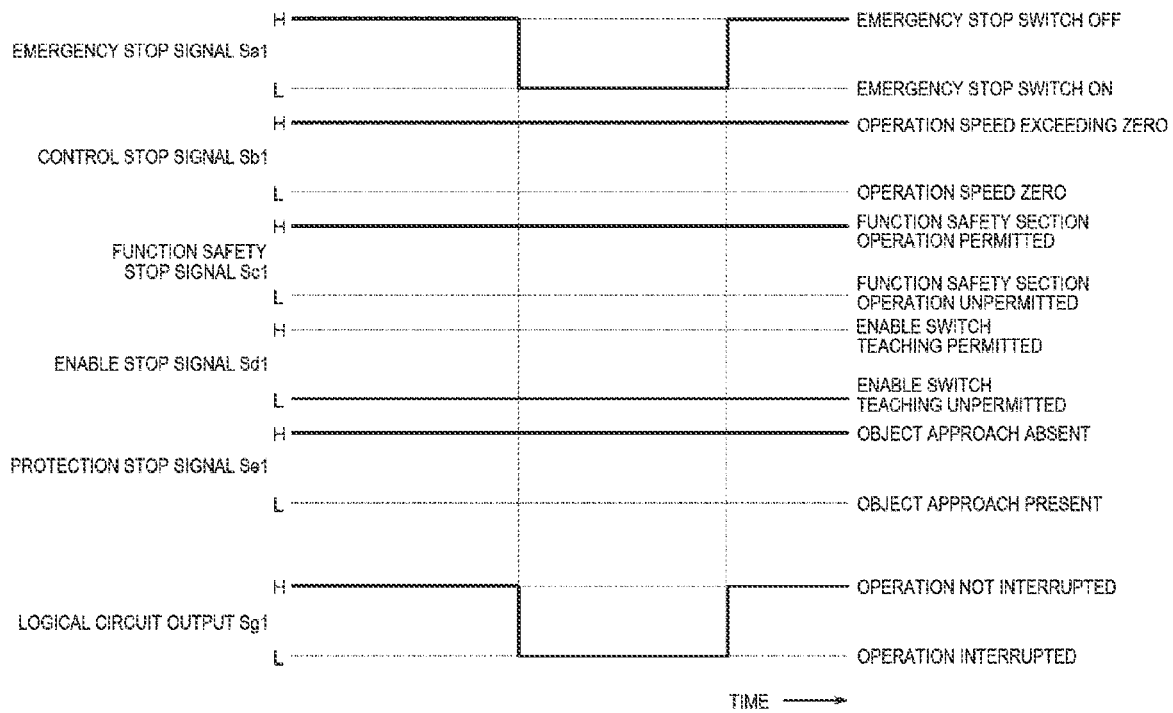
FIG. 7 is a timing chart showing an example of the first signals, which are the stop signals on the first interruption circuit side, and the logical circuit output.

FIGS. 6 to 8 are respectively timing charts showing examples of the first signals, which are the stop signals on the first interruption circuit 54A side, and the logical circuit output Sg1. In the following explanation, the first signals are explained. Since the second signals are the same as the first signals, explanation about the second signals is omitted. In FIGS. 6 to 8, thick lines respectively represent signals.

In FIGS. 6 to 8, when the emergency stop switch 84 is not pressed, that is, OFF, the emergency stop signal Sa1 is at the high level and, when the emergency stop switch 84 is pressed, that is, ON, the emergency stop signal Sa1 is at the low level.

In FIGS. 6 to 8, when operation speed instructed from the host control section 81 exceeds zero, the control stop signal Sb1 is at the high level and, when the operation speed instructed from the host control section 81 is zero, the control stop signal Sb1 is at the low level.

Further, in FIGS. 6 to 8, when the function safety section 82 does not recognize an abnormality in monitor results of the various sensors and the like, that is, when the function safety section 82 permits the robot 2 to operate, the function safety stop signal Sc1 is at the high level. On the other hand, when the function safety section 82 recognizes an abnormality in the monitor results of the various sensors and the like, that is, the function safety section 82 does not permit the robot 2 to operate, the function safety stop signal Sc1 is at the low level.

In FIGS. 6 to 8, when the enable switch 85 is pushed in to a predetermined position, that is, the teaching work by the teaching pendant 86 can be performed, the enable stop signal Sd1 is at the high level. On the other hand, when the enable switch 85 is not pushed in or is pushed in to a position other than the predetermined position, since the teaching work by the teaching pendant 86 cannot be performed, the enable stop signal Sd1 is at the low level.

Further, in FIGS. 6 to 8, when the object-approach detecting section 87 does not detect approach of an object, the protection stop signal Se1 is at the high level. On the other hand, when the object-approach detecting section 87 detects approach of an object, the protection stop signal Se1 is at the low level.

FIG. 6 represents signals at a normal time, that is, at the time when the power to the driving sections 401 to 406 is not interrupted. At the normal time, as shown in FIG. 6, the enable stop signal Sd1 is at the low level and the protection stop signal Se1 is at the high level. Accordingly, the OR Sf1 shown in FIG. 4 is at the high level. The emergency stop signal Sa1, the control stop signal Sb1, and the function safety stop signal Sc1 are respectively at the high level in FIG. 6. Therefore, the logical circuit output Sg1, which is AND of these signals and the OR Sf1, is also at the high level.

When the logical circuit output Sg1 is input to the power interruption circuit 54, the first interruption circuit 54A is connected. The second interruption circuit 54B not explained above is also connected. Accordingly, an AC voltage is supplied from the AC power supply 71 to the converter 72. Power is supplied to the driving sections 401 to 406 via the driving control sections 301 to 306. The operation of the power interrupting section 83 at the normal time is as explained above.

FIG. 7 represents signals including an emergency stop occurrence time, that is, a time period when the emergency stop switch 84 is pressed. At the emergency stop occurrence time, as shown in FIG. 7, the emergency stop signal Sa1 is at the low level. Accordingly, the logical circuit output Sg1 at the emergency stop occurrence time is at the low level.

When the logical circuit output Sg1 is input to the power interruption circuit 54, the first interruption circuit 54A is disconnected in the time period. The second interruption circuit 54B not explained above is also disconnected in the time period. Accordingly, the power to the driving sections 401 to 406 is interrupted in the time period.

FIG. 8 represents signals including at a protection stop occurrence time, that is, a time period in which the object-approach detecting section 87 detects approach of an object. At the protection stop occurrence time, as shown in FIG. 8, the protection stop signal Se1 is at the low level. Accordingly, in the time period, the OR Sf1 is also at the low level and the logical circuit output Sg1 is also at the low level.

When the logical circuit output Sg1 is input to the power interruption circuit 54, the first interruption circuit 54A is disconnected in the time period. The second interruption circuit 54B not explained above is also disconnected in the time period. Accordingly, in the time period, the power to the driving sections 401 to 406 is interrupted.

Among the stop signals explained above, the first signals according to this embodiment include the emergency stop signal Sa1, the control stop signal Sb1, the function safety stop signal Sc1, the enable stop signal Sd1, and the protection stop signal Se1. However, the first signals do not need to include all of the five types of signals and preferably includes at least the emergency stop signal Sa1, the enable stop signal Sd1, and the protection stop signal Se1.

As explained above, the emergency stop signal Sa1 is a signal for stopping the operation of the robot 2 output from the emergency stop switch 84 (the emergency-stop-signal generating section). As explained above, the enable stop signal Sd1 is a signal for stopping the operation of the robot 2 output from the enable switch 85 (the enable-stop-signal generating section) operated by the operator when approach of the operator (a user) to the robot 2 is permitted. As explained above, the protection stop signal Se1 is a signal for stopping the operation of the robot 2 output from the object-approach detecting section 87 (the protection-stop-signal generating section) that detects approach of an object to the robot 2.

With the stop signals including such signals, it is possible to stop the operation of the robot 2 at least at an abnormal time or an approach time of the object or the operator. Consequently, it is possible to sufficiently guarantee safety of the robot system 1.

As explained above, the logical operation circuit 52 according to this embodiment includes the OR circuits 522A and 522B (the OR operation circuits) and the AND circuits 524A and 524B (the AND operation circuits).

The OR circuits 522A and 522B calculate the ORs Sf1 and Sf2 of the enable stop signal Sd1 and Sd2 and the protection stop signals Se1 and Se2. The AND circuits 524A and 524B calculate at least ANDs of the emergency stop signals Sa1 and Sa2 and the ORs Sf1 and Sf2.

With such a configuration, by calculating the ORs Sf1 and Sf2 of the enable stop signals Sd1 and Sd2 and the protection stop signals Se1 and Se2 that are closely related to each other in the teaching work for the robot 2, it is possible to appropriately integrate the signals. With the AND circuits 524A and 524B, it is possible to realize the robot control device 8 that does not hinder the teaching work for the robot 2, has a low failure rate, and is capable of coping with an emergency stop.

As explained above, the robot control device 8 according to this embodiment includes the host control section that controls the operations of the driving control sections 301 to 306. The stop signals received by the logical operation circuit 52 include the control stop signals Sb1 and Sb2 for stopping the operation of the robot 2 output from the host control section 81. The AND circuits 524A and 524B (the AND operation circuits) calculate ANDs of the emergency stop signals Sa1 and Sa2, the control stop signals Sb1 and Sb2, and the ORs Sf1 and Sf2.

With such a configuration, it is possible to realize the robot control device 8 that does not hinder the teaching work for the robot 2, has a low failure rate, and is capable of coping with an emergency stop and a control stop.

Further, as explained above, the robot control device 8 according to this embodiment includes the function safety section 82 that detects an operation state of the robot arm 10. The stop signals received by the logical operation circuit 52 include the function safety stop signals Sc1 and Sc2 for stopping the operation of the robot 2 output from the function safety section 82. The AND circuits 524A and 524B (the AND operation circuits) calculate ANDs of the emergency stop signals Sa1 and Sa2, the function safety stop signals Sc1 and Sc2, and the ORs Sf1 and Sf2.

With such a configuration, it is possible to realize the robot control device 8 that does not hinder the teaching work for the robot 2, has a low failure rate, and is capable of coping with an emergency stop and a function safety stop.

In the robot control device 8 according to this embodiment, the stop signals received by the logical operation circuit 52 are duplexed into the first signals and the second signals. The logical operation circuit 52 includes the first operation circuit 52A that performs a logical operation about the first signals and outputs the logical circuit output Sg1 and the second operation circuit 52B that performs a logical operation about the second signals and outputs the logical circuit output Sg2. The power interruption circuit 54 includes the first interruption circuit 54A that interrupts the power of the driving sections 401 to 406 based on the logical circuit output Sg1 and the second interruption circuit 54B that interrupts the power of the driving sections 401 to 406 based on the logical circuit output Sg2.

With such a configuration, signal paths can be duplexed for the transmission of the stop signals to the interruption of the power. Consequently, even if a problem occurs in transmission of signals in one signal path, the transmission of the signals can be continued in the other signal path. As a result, it is possible to achieve further reduction of the failure rate of the robot control device 8 and further improve reliability.

Further, the robot control device 8 according to this embodiment includes the photocouplers 58A and 58B (the insulating elements) that are provided in the signal paths of the stop signals and transmit the stop signals while electrically insulating the signal paths.

Such a robot control device 8 can electrically insulate the signal paths. Therefore, it is possible to design the logical operation circuit 52 irrespective of specifications of the stop signals. In other words, it is possible to realize the logical operation circuit 52 applicable to stop signals having various specifications.

The logical operation circuit 52 and the power interruption circuit 54 may be configured using integrated circuit components but are preferably configured by discrete components. Since the discrete components have a lower failure rate compared with the integrated circuit components, the discrete components contribute to a decrease in the failure rate of the robot control device 8. The discrete components mean electronic components having single functions.

1.3.8. Mismatch Circuit

As explained above, the power interrupting section 83 shown in FIG. 4 includes the mismatch circuit 56.

The mismatch circuit 56 is connected to a signal path divided from a signal path connecting the first operation circuit 52A and the power interruption circuit 54 and a signal path divided from a signal path connecting the second operation circuit 52B and the power interruption circuit 54. Accordingly, the logical circuit outputs Sg1 and Sg2 are respectively input to the mismatch circuit 56.

A signal path connecting the mismatch circuit 56 and the power interruption circuit 54 is also provided. A mismatch signal Sh output from the mismatch circuit 56 is input to the power interruption circuit 54.

FIG. 9 is a schematic diagram showing a circuit configuration of the mismatch circuit 56 shown in FIG. 4. In FIG. 9, only main elements are illustrated. Illustration of a part of elements is omitted.

The mismatch circuit 56 shown in FIG. 9 includes a mismatch diagnosis circuit 562 and a latch circuit 564. A photocoupler 59C, which is an insulating element, is provided in a signal path connecting an output terminal of the mismatch diagnosis circuit 562 and an input terminal of the latch circuit 564.

The mismatch diagnosis circuit 562 includes an XOR circuit 563 that receives an input of the logical circuit outputs Sg1 and Sg2 and outputs the mismatch signal Sh. The XOR circuit 563 calculates exclusive OR of the logical circuit output Sg1 and the logical circuit output Sg2. That is, the XOR circuit 563 outputs the mismatch signal Sh that is activated when the logical circuit output Sg1 and the logical circuit output Sg2 do not match. The mismatch signal Sh is input to the power interruption circuit 54 through the latch circuit 564.

In this way, the mismatch circuit 56 outputs the mismatch signal Sh that is activated when the logical circuit output Sg1 and the logical circuit output Sg2 do not match. The first interruption circuit 54A and the second interruption circuit 54B interrupt the power of the driving sections 401 to 406 when the mismatch signal Sh is activated.

With such a configuration, the power interruption circuit 54 is capable of performing interruption control for power based on the mismatch signal Sh. Specifically, when the logical circuit output Sg1 and the logical circuit output Sg2 do not match, it is considered highly likely that a problem has occurred in the logical operation circuit 52, the signal paths, or the like. Accordingly, when the mismatch signal Sh is active, it is possible to further improve the safety of the robot system 1 by performing control for interrupting power in the power interruption circuit 54.

Figure 10:
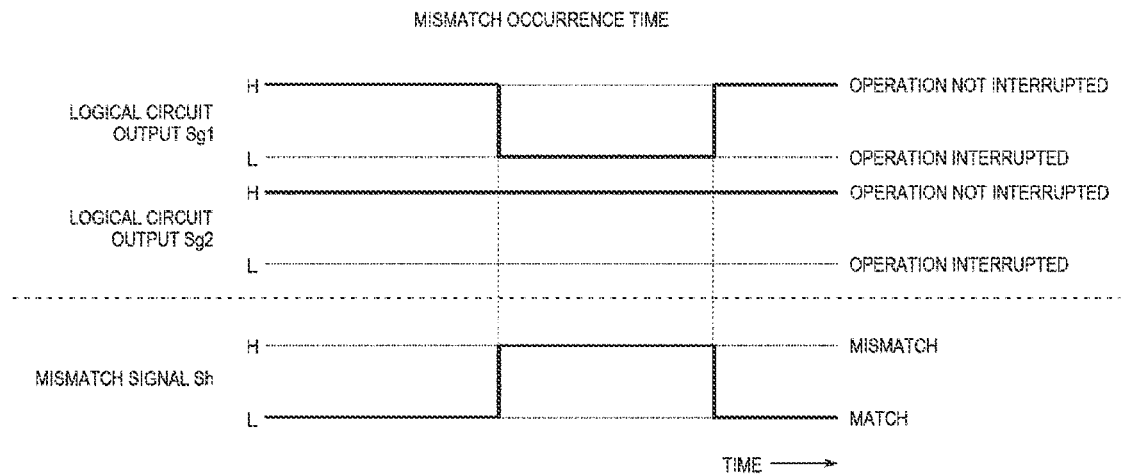
FIG. 10 is a timing chart showing an example of logical circuit outputs and a mismatch signal.

FIG. 10 is a timing chart showing an example of the logical circuit outputs Sg1 and Sg2 and the mismatch signal Sh. In FIG. 10, thick lines represent signals. In FIG. 10, an example showing a failure state is shown. Whereas the logical circuit output Sg2 is always at the high level, the logical circuit output Sg1 is at the low level in some time period. Accordingly, in the time period, the logical circuit outputs Sg1 and Sg2 do not match with each other. Therefore, the mismatch signal Sh is active in the time period.

The mismatch signal Sh is input to relay power switches 545A and 545B included in the power interruption circuit 54 shown in FIG. 5. The relay power switch 545A is provided between the relay power supply Vr and the coil 544A and switches connection and disconnection of a current path. The relay power switch 545B is provided between the relay power supply Vr and the coil 544B and switches connection and disconnection of a current path. The relay power switches 545A and 545B are configured to, when the mismatch signal Sh is inactive, feed electric currents to the coils 544A and 544B and connect the current paths via the contacts 543A and 543B and, when the mismatch signal Sh is active, not feed electric currents to the coils 544A and 544B, and disconnect the current paths via the contacts 543A and 543B. When the current paths are disconnected, the first relay 542A and the second relay 542B, which are normally open, disconnect the power supply paths.

Therefore, when the logical circuit outputs Sg1 and Sg2 do not match with each other, both of the first relay 542A and the second relay 542B can disconnect the power supply paths irrespective of the logical circuit outputs Sg1 and Sg2. With such a configuration, when it is highly likely that a problem has occurred in the logical operation circuit 52, the signal paths, or the like, it is possible to interrupt the power of the driving sections 401 to 406 irrespective of other conditions. Consequently, when a failure or the like occurs, it is possible to prevent occurrence of a state in which failure parts increase while the operator cannot notice the failure and the power cannot be finally interrupted.

The circuit configuration of the mismatch diagnosis circuit 562 explained above is an example and is not limited to this.

As explained above, the mismatch circuit 56 includes the latch circuit 564 that keeps a state at the time when the mismatch signal Sh is activated. The latch circuit 564 shown in FIG. 9 includes a PNP transistor 565 and an NPN transistor 566.

A collector of the PNP transistor 565 and a base of the NPN transistor 566 are input terminals of the latch circuit 564. The mismatch signal Sh output from the mismatch diagnosis circuit 562 is input to the collector of the PNP transistor 565 and the base of the NPN transistor 566. An emitter of the PNP transistor 565 is connected to a latch circuit power supply VL. A voltage of the latch circuit power supply VL is set to, for example, 24 V. An emitter of the NPN transistor 566 is connected to the ground. A base of the PNP transistor 565 and a collector of the NPN transistor 566 are output terminals of the latch circuit 564 and are connected to the relay power switches 545A and 545B shown in FIG. 5.

In such a latch circuit 564, when the mismatch signal Sh is activated, an electric current flows to the base of the NPN transistor 566 and the NPN transistor 566 is turned on according to the flow of the electric current. Therefore, the electric current flows from the emitter of the PNP transistor 565 toward the NPN transistor 566 through the base of the PNP transistor 565. Then, the PNP transistor 565 is turned on to keep the NPN transistor 566 on. Consequently, a signal flowing from the latch circuit power supply VL toward the power interruption circuit 54 is transmitted as a latched mismatch signal Sh. The latched mismatch signal Sh is input to the relay power switches 545A and 545B. The power supply paths are disconnected by the first relay 542A and the second relay 542B.

The latch circuit 564 can keep the first relay 542A and the second relay 542B off in this way. Thereafter, even if the mismatch signal Sh output from the mismatch diagnosis circuit 562 changes to inactive, the latch circuit 564 can continue to interrupt the power. Such a state is referred to as latch state. A function for causing the latch state is referred to as latch function.

By imparting the latch function to the mismatch circuit 56 of the robot control device 8, when the mismatch signal Sh is once activated, it is possible to prevent the interruption of the power from being releases thereafter. Consequently, it is possible to prevent the robot system 1 from continuing to operate in a state in which a cause of the activation of the mismatch signal Sh remains, that is, a state in which a problem or the like occurs in the logical operation circuit 52, the signal paths, or the like. As a result, it is possible to avoid a situation in which the safety of the robot system 1 is deteriorated because, for example, a secondary problem occurs.

In order to release the latch state, for example, the power supply of the robot control device 8 only has to be turned on again. The circuit configuration of the latch circuit 564 explained above is an example and is not limited to this.

2. Second Embodiment

A robot control device according to a second embodiment is explained.

Figure 11:
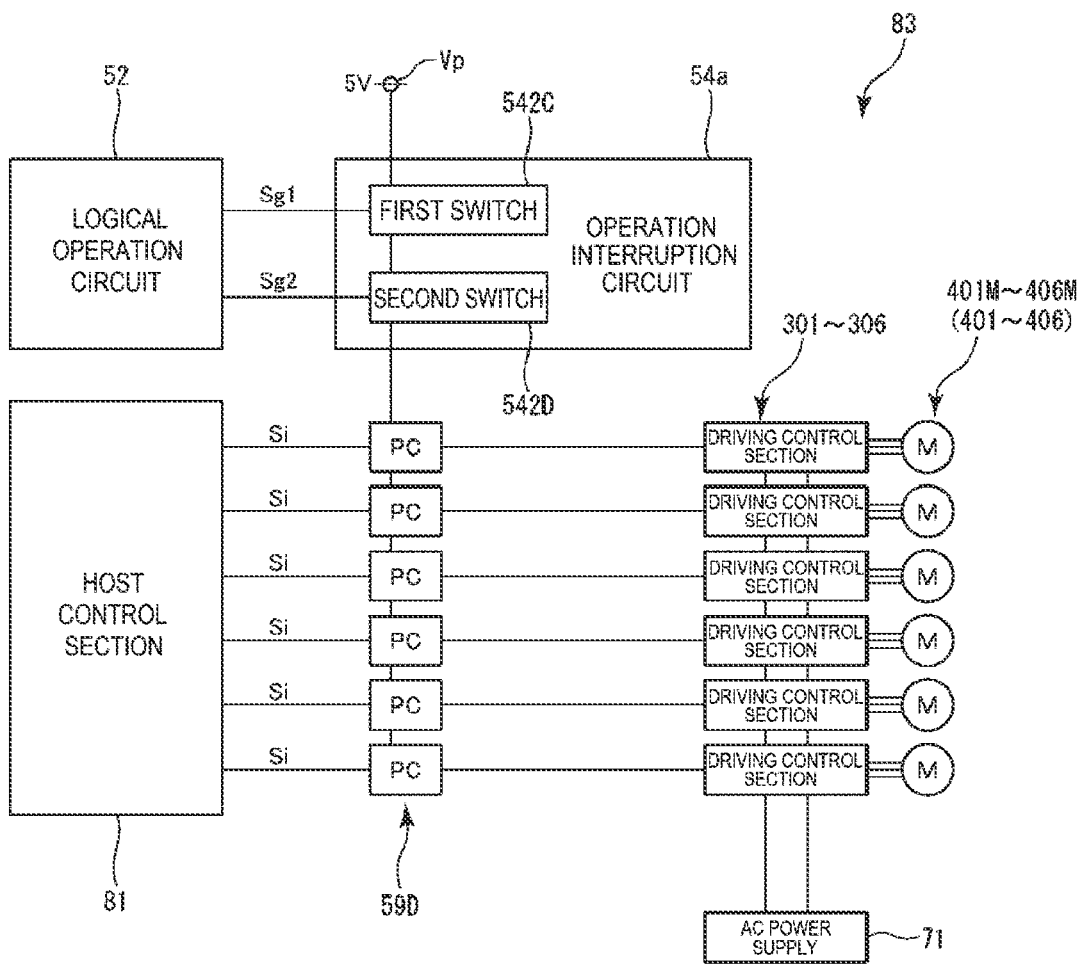
FIG. 11 is a schematic diagram showing a circuit configuration of a power interruption circuit included in a robot control device according to a second embodiment.

FIG. 11 is a schematic diagram showing a circuit configuration of a power interruption circuit included in the robot control device according to the second embodiment.

The second embodiment is explained below. In the following explanation, differences from the first embodiment are mainly explained. Explanation about similarities to the first embodiment is omitted. In FIG. 11, the same components as the components in the first embodiment are denoted by the same reference numerals and signs.

The power interruption circuit 54 according to the first embodiment explained above interrupts the electric power supplied to the driving control sections 301 to 306 to thereby interrupt the power of the driving sections 401 to 406. In contrast, a power interruption circuit 54a according to this embodiment interrupts control signals Si input to the driving control sections 301 to 306 to thereby interrupt the power of the driving sections 401 to 406.

In FIG. 11, the host control section 81 and the driving control sections 301 to 306 are electrically connected by the signal paths as many as the driving sections 401 to 406. Photocouplers 59D are provided in the signal paths. The control signals Si output from the host control section 81 are transmitted through the signal paths and input to the driving control sections 301 to 306 via the photocouplers 59D.

The photocouplers 59D are insulting elements including not-shown light emitting sections and light receiving sections. A photocoupler power supply Vp is used for light emission. A voltage of the photocoupler power supply Vp is set to, for example, 5 V. The photocouplers 59D transmit the control signals Si through photoelectric conversion by the light emitting sections and inverse conversion by the light receiving sections. A power supply for light emission is necessary for the light emitting sections of such photocouplers 59D. Therefore, the photocouplers 59D and the photocoupler power supply Vp are connected by a current path.

The power interruption circuit 54a shown in FIG. 11 includes a first switch 542C and a second switch 542D provided in the current path. The first switch 542C and the second switch 542D are connected in series in the current path. The first switch 542C and the second switch 542D respectively perform connection and disconnection of the current path to thereby switch energization from the photocoupler power supply Vp to the photocouplers 59D.

The logical circuit output Sg1 is input to the first switch 542C from the first operation circuit 52A. When the logical circuit output Sg1 is at the high level, the first switch 542C is connected. When the logical circuit output Sg1 is at the low level, the first switch 542C is disconnected.

The logical circuit output Sg2 from the second operation circuit 52B is input to the second switch 542D. When the logical circuit output Sg2 is at the high level, the second switch 542D is connected. When the logical circuit output Sg2 is at the low level, the second switch 542D is disconnected.

Therefore, the power interruption circuit 54a can interrupt the transmission of the control signals Si based on the logical circuit outputs Sg1 and Sg2, which are operation results of the logical operation circuit 52. When the control signals Si are interrupted, the driving control sections 301 to 306 cannot control the operation of the driving sections 401 to 406. As a result, the power of the driving sections 401 to 406 is interrupted.

As explained above, the power interruption circuit 54a according to this embodiment interrupts, based on the logical circuit outputs Sg1 and Sg2, the control signals Si input to the driving control sections 301 to 306 to thereby interrupt the power of the driving sections 401 to 406.

With such a configuration, the same effects as the effects in the first embodiment are obtained. That is, even when interruption control for power is performed based on a plurality of types of signals, the power interruption circuit 54a can be integrated as one power interruption circuit. Consequently, it is possible to suppress redundancy of the power interruption circuit 54a and reduce a failure rate while realizing interruption control for power by various signals. As a result, it is possible to realize the robot control device 8 that can improve the safety of the robot system 1.

Although not illustrated, in this embodiment, as in the first embodiment, the robot control device may include a mismatch circuit.

The robot control device and the robot system according to the present disclosure are explained above based on the embodiments shown in the figures. However, the robot control device and the robot system according to the present disclosure are not limited to the embodiments. The components of the sections can be replaced with any components having the same functions. Any other components may be added to the robot control device and the robot system according to the embodiments. Waveforms of the signals shown in the timing charts are examples. In the present disclosure, the waveforms are not limited to those shown in the figures.

What is claimed is:

1. A robot control device that controls an operation of a robot including a robot arm, a motor configured to drive the robot arm, and a motor driver configured to receive electric power and output motive power to the motor based on a control signal, the robot control device comprising:
   a logical operation circuit configured to perform a logical operation about a stop signal and output an operation result; and
   a power interruption circuit configured to interrupt, based on the operation result, the electric power supplied to the motor driver or the control signal input to the motor driver to thereby interrupt the motive power for the motor,
   wherein the stop signal includes:
     an emergency stop signal for stopping the operation of the robot;
     a protection stop signal for stopping the operation of the robot when approach of an object to the robot is detected; and
     an enable stop signal for stopping the operation of the robot, the enable stop signal is executed by an operation of a user when approach of the user to the robot is permitted, and
   the logic operation circuit includes:
     an OR operation circuit configured to calculate OR of the protection stop signal and the enable stop signal; and
     an AND operation circuit configured to calculate AND of the emergency stop signal and the OR.

2. The robot control device according to claim 1, further comprising a host controller configured to control an operation of the motor driver, wherein
   the stop signal includes a control stop signal for stopping the operation of the robot output from the host controller, and
   the AND operation circuit calculates AND of the emergency stop signal, the control stop signal, and the OR.

3. The robot control device according to claim 1, further comprising a function safety controller configured to detect an operation state of the robot arm, wherein
   the stop signal includes a function safety stop signal for stopping the operation of the robot output from the function safety controller, and
   the AND operation circuit calculates AND of the emergency stop signal, the function safety stop signal, and the OR.

4. The robot control device according to claim 1, wherein
the stop signal is duplexed into a first signal and a second signal,
the logical operation circuit includes:
> a first operation circuit configured to perform a logical operation about the first signal and output a first operation result; and
> a second operation circuit configured to perform a logical operation about the second signal and output a second operation result, and the power interruption circuit includes:
> a first interruption circuit configured to interrupt the motive power of the motor based on the first operation result; and
> a second interruption circuit configured to interrupt the motive power of the motor based on the second operation result.

5. The robot control device according to claim 4, further comprising a mismatch circuit configured to output a mismatch signal that is activated when the first operation result and the second operation result do not match, wherein
the first interruption circuit and the second interruption circuit interrupt the motive power of the motor when the mismatch signal is activated.

6. The robot control device according to claim 5, wherein
the mismatch circuit includes a latch circuit configured to keep a state at a time when the mismatch signal is activated.

7. The robot control device according to claim 1, further comprising an insulating element provided in a signal path of the stop signal and configured to transmit the stop signal while electrically insulating the signal path.

8. The robot control device according to claim 1, wherein
the logical operation circuit and the power interruption circuit are configured by discrete components.

9. A robot system comprising:
a robot including a robot arm, a motor configured to drive the robot arm, and a motor driver configured to receive electric power and output motive power to the motor based on a control signal; and
a robot control device configured to control an operation of the robot, the robot control device including:
> a logical operation circuit configured to perform a logical operation about a stop signal and output an operation result; and
> a power interruption circuit configured to interrupt, based on the operation result, the electric power supplied to the motor driver or the control signal input to the motor driver to thereby interrupt the motive power for the motor, wherein the stop signal includes:
> an emergency stop signal for stopping the operation of the robot;
> a protection stop signal for stopping the operation of the robot when approach of an object to the robot is detected; and
> an enable stop signal for stopping the operation of the robot, the enable stop signal is executed by an operation of a user when approach of the user to the robot is permitted, and the logic operation circuit includes:
> an OR operation circuit configured to calculate OR of the protection stop signal and the enable stop signal; and
> an AND operation circuit configured to calculate AND of the emergency stop signal and the OR.

* * * * *